May 28, 1963  A. E. SCHIERHORST  3,091,040
MESSAGE GENERATOR

Filed Sept. 19, 1960  9 Sheets-Sheet 1

INVENTOR
ALBERT E. SCHIERHORST

BY *James B Boyer*

ATTORNEY

May 28, 1963  A. E. SCHIERHORST  3,091,040
MESSAGE GENERATOR

Filed Sept. 19, 1960   9 Sheets-Sheet 2

May 28, 1963  A. E. SCHIERHORST  3,091,040
MESSAGE GENERATOR

Filed Sept. 19, 1960  9 Sheets-Sheet 7

United States Patent Office 3,091,040
Patented May 28, 1963

3,091,040
MESSAGE GENERATOR
Albert E. Schierhorst, Beltsville, Md., assignor to ACF Industries, Incorporated, New York, N.Y., a corporation of New Jersey
Filed Sept. 19, 1960, Ser. No. 56,940
4 Claims. (Cl. 35—10.4)

This invention relates to circuitry adapted to provide coded message output signals, and more particularly to circuitry for providing information pulses which may be used to simulate the modulating signals which are applied to the carrier signal output of a transmitting station, or may be used to actually modulate such a signal.

Maintenance of the ground-based guidance systems which serve to control the flight of missiles, drone aircraft and the like becomes an increasingly difficult operation as guidance systems increase in size and complexity. As a result, it is necessary to provide extensive training in the operation of such systems for the maintenance personnel assigned to the various installations. In the training of maintenance personnel it is desirable and even necessary that the use of operational ground stations be avoided. Since it is impractical to set up a complete ground control system merely for the purpose of training, trainer systems have been devised which will simulate all the functions, or malfunctions, of a guidance system. These simulators are designed to enable an instructor to duplicate any malfunction that might occur in an operational, or "in-line," guidance system in order to provide trainees with the opportunity to detect errors and to find the source of such errors.

Each trainer simulator is provided with maintenance consoles which are duplicates of those used in conjunction with the "in-line" guidance system. On the in-line maintenance consoles may be displayed the waveforms which appear in various portions of the guidance system equipment with which they are associated. The maintenance console of the simulator must be able to display duplications of these same wave forms if it is to be of value as a training device. Circuitry must therefore be provided in the simulator which is capable of producing those waveforms which appear in the in-line equipment. The simulator must be able to duplicate not only the waveforms that appear under normal conditions, but those that result from errors and malfunctions.

One of the waveforms that must be reproduced in such a simulator is the "message" signal, which signal is utilized in the in-line equipment to modulate the transmitted carrier signal. The message signal is made up of a series of pulses digitally arranged to supply information to the particular aircraft or missile which is under the control of the guidance system. This message signal is produced in a simulator by means of a message generator.

In the past, the generation of this type of message signal has been accomplished by the use of diode matrices with flip-flops and digital arrays. The message signals produced by such systems have been used to modulate a ground control station transmiter, such as a radar transmitter. Such systems, although reliable, are exceedingly complex and therefore are difficult to set up and maintain. Such systems also use large numbers of circuit elements such as tubes and transistors, and for this reason are unsatisfactory.

The present invention is directed toward a message generating system which will overcome the disadvantages of the prior art, and will provide a system for generating a train of spaced digital message pulses simply, economically and reliably. The pulses produced by the generator system of the invention are particularly adapted for use in a simulator system to duplicate the signals produced by the message generator of a guidance system. The message generator of the invention, however, is not limited to use in simulators, but is suitable for use in the in-line guidance equipment itself, as well as in any other situation where a train of spaced digital message pulses might be utilized. Such other uses might be found, for example, in Teletype transmission, in the production of range marks on a radar scanning screen, or in the testing of communications equipment for accuracy of transmission.

A feature of the invention is the provision of an adjustable message generator in which any desired message may be easily and quickly selected by varying the spacing between successive pulses, or by varying the amplitude of successive pulses.

Another feature of the invention is the provision of a message generator utilizing multi-position magnetron beam switching tubes which are driven by two out-of-phase signals, the output signals obtained from selected positions of said tubes comprising the pulsed message train output.

Accordingly, the circuit of the invention is arranged to provide a train of output pulses, this train of pulses being obtained by means of cascaded magnetron beam switching tubes in which the conducting beam is commutated from one target electrode to the next, successively. By differentiating the voltages which appear on selected target electrodes and feeding the resulting pulses to a common output line the desired message output may be obtained.

More particularly, the system of the invention comprises a plurality of commutator devices connected in cascade. These commutator devices are turned on by means of a beam forming pulse obtained from a monostable multivibrator and are driven by a pair of alternating, out-of-phase voltages obtained from a phase inverting transformer. A pulse source, which may also be the main command source which initiates the operation of a radar transmitter, serves to trigger the device of the invention by driving the monostable multivibrator away from its quiescent state. This produces a pulse which serves to turn on the commutators. While the multivibrator is in its non-quiescent state it provides a gating signal to an oscillator, causing the oscillator to provide an alternating output signal for the duration of the gating signal. This alternating signal is fed into the phase inverting transformer which converts it into two out-of-phase alternating signals.

Each of the plurality of cascaded commutator devices includes a magnetron beam switching (MBS) tube such as the type 6700 manufactured by the Burroughs Corporation of Plainfield, New Jersey. The MBS tubes are multi-position, high-vacuum, constant current distributors having a plurality of identical "arrays" symmetrically located about an oxide-coated cathode to form different switch positions for the conducting beam of the tube. These devices operate in the presence of an axial magnetic field provided by a small cylindrical magnet which is permanently bonded to the glass envelope of the tube. Each of the arrays consists of a spade element which forms and locks the conduction beam of the tube, a target output plate which receives the conduction beam from the cathode and which is essentially a constant-current source, and a switching grid which serves to switch the beam from array to array. By selectively connecting differentiating circuits to various target output plates, output pulses may be obtained from the selected targets as the conduction beam switches from array to array, or from switch position to switch position, under control of the signals from the phase inverting transformer.

When the conduction beam of an MBS tube is switched to a selected target element a pulse is supplied to the common output line; when the beam is switched to an unselected target element, no output signal is produced.

By switching the conduction beam in turn to each array of the MBS tube of the first commutator, extinguishing this beam, forming a new beam in the tube of the next commutator device and so on through all the cascaded commutators, and feeding the outputs of the selected target elements through differentiating networks to a common output line, a coded pulse train can be obtained. The length of the pulse train so obtained is limited only by the number of cascaded commutators. This train of output pulses is fed through a pulse amplifier to a trigger circuit which operates a blocking oscillator. This oscillator provides, in response to each pulse of the train, an output pulse of predetermined width and of an amplitude which may be varied if desired. The choice of which target elements are to be connected to the common output line determines the spacing between succeeding pulses, this spacing being representative of the message to be generated. If means are also provided for varying the amplitude of these pulses, then additional information may be carried by this train of pulses. This amplitude modulation is not utilization in the simulator system described herein; however, such modulation of the output pulses might be useful when this signal generator is utilized in other environments, particularly where greater information-carrying ability is desired.

For a more complete description of the structure and operation of the system of the invention reference should now be made to the following specification taken in conjunction with the accompanying drawings in which:

FIG. 4b is a schematic diagram of an alternative form of the phase inverting transformer of FIG. 4a;

Figure 1A:
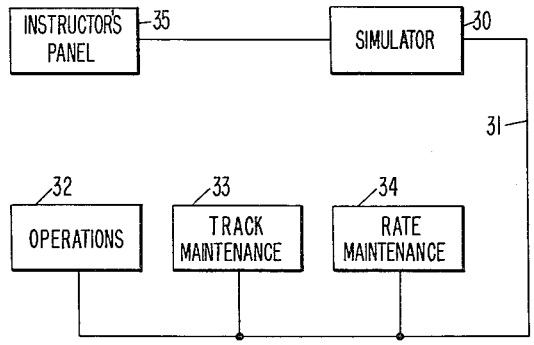
FIG. 1a is a block diagram of a simulator system in which the circuit of the invention may be incorporated.

In FIG. 1a there is shown a block 30 which is representative of that portion of a guidance system simulator which includes the waveform-producing circuitry used to duplicate the various wave shapes that appear in an in-line guidance system. A cable 31 connects the simulator 30 to its associated consoles 32, 33 and 34. Console 32 is the "operations" console and is the control panel used when simulating an actual guidance situation. The rate maintenance console 34 is a control panel which is used to test the operation of the rate portion of the simulator, and is used to aid in the training of maintenance personnel for this portion of an in-line system. The track maintenance console 33 is utilized in the training of maintenance personnel who are to be concerned with the tracking portion of in-line guidance systems.

The track maintenance console 33 is adapted to display 24 different waveforms which appear in different portions of a guidance system. These 24 signals are reproduced in the simulator 30 for display on console 33. One of the signals to be displayed on console 33 is the message signal which is used to modulate the transmitted radar signals in a guidance system. This message signal is provided by the message generator of the present invention. An instructor panel 35 is provided to enable an instructor to set up various messages in the generator, which messages then appear at the track maintenance console 33 where a trainee may display them for purposes of analysis.

Figure 1B:
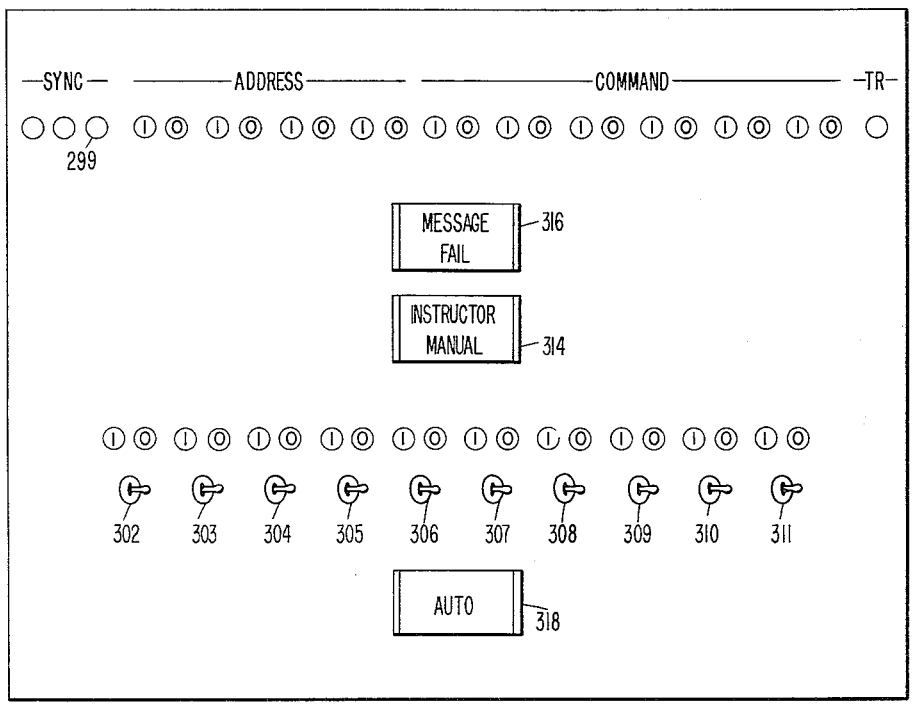
FIG. 1b is a schematic showing of a portion of an instructor's panel.

The instructor's panel 35 is shown in greater detail in FIG. 1b. A row of indicator lights 299 across the top of panel 35 indicate which arrays of the commutator elements of the message generator are connected to the message generator output line. These arrays are shown as being connected in pairs, one array of a pair representing a binary one when connected to the output line, the other array being connected to the output line to represent a binary zero. The commutator arrays that are provided in this particular embodiment of the invention are divided up into sections, these sections representing various portions of the generated message. The first three arrays of the generator provide synchronizing pulses, the next eight output positions, or arrays, provide the address of the missile or aircraft being controlled, the next twelve output positions carry the command signals which carry instructions to the craft being controlled and the final output position provides a trigger pulse. Toggle switches 302 through 311 are provided to allow an instructor to set up the address and the command pairs of positions so that the output pulses of the generator may be selected to represent either binary ones or binary zeros. Indicating lights are provided for each toggle switch in order to show the condition of the respective switches. By pressing the instructor manual switch 314, the instructor can energize the switches 302 through 311 and control the message generator. By pressing either the message fail switch 316 or the automatic switch 318 control of message generator is removed from the instructor's panel 35.

Figure 1C:
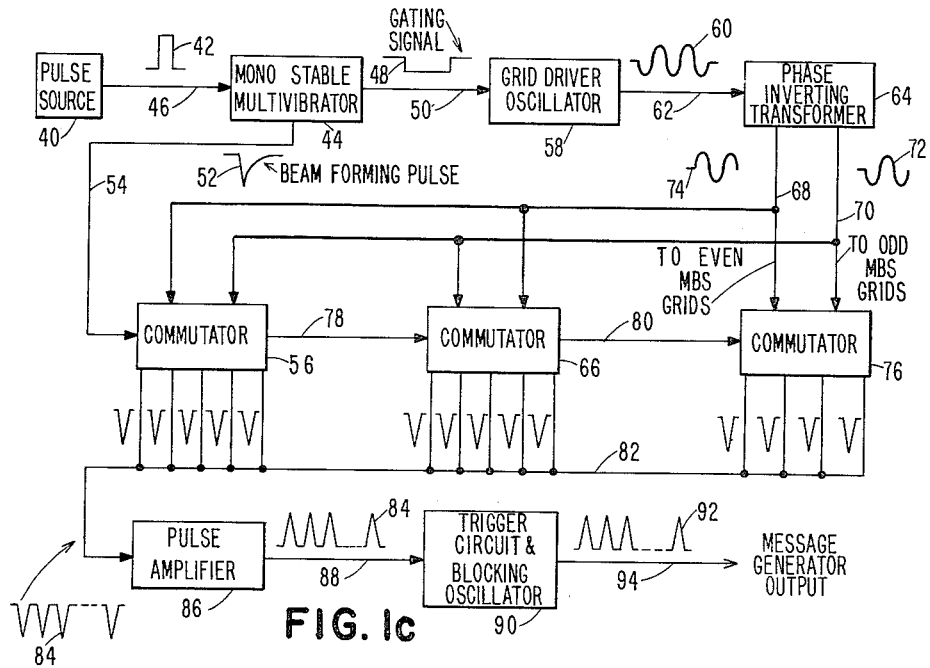
FIG. 1c is a block diagram of the message generator circuitry.

Referring now to FIG. 1c of the drawings, which shows one embodiment of the message generator in block form, the reference numeral 40 indicates a source of pulse repetition frequency (PRF) pulses 42. Each PRF pulse 42 serves to trigger the system and causes it to run through one complete cycle of operation. Each such cycle of operation must be triggered by an individual PRF pulse. The triggering pulse 42 is applied to a monostable multivibrator 44 by way of line 46, causing the multivibrator to change its state of conduction. As a result of this change of state in the multivibrator 44, a gating signal 48 is provided on line 50 and an initiating, or beam forming, pulse 52 appears on line 54. Pulse 52 is applied to the first commutator or multiposition distributor 56, causing a conducting beam to form at the first target output plate, or target electrode, of the magnetron beam switching tube of this commutator.

The gating signal 48 is applied, by way of line 50, to the grid driver oscillator 58, gating the oscillator ON. Oscillator 58 remains ON until the gating signal ends, and provides an alternating output signal 60 during this time. The frequency of the output signal 60 is determined by the parameters of oscillator 58. This output signal passes, by way of line 62, to a phase inverting transformer 64 having two output lines 68 and 70. The phase inverting transformer provides two out-of-phase driving signals 72 and 74. Driving signal 72 may, for example, be in phase with the alternating signal 60, with driving signal 74 phase-shifted 180 degrees with respect thereto.

After conduction has been established in the magnetron beam switching (MBS) tube of commutator 56 by the application of pulse 52 thereto, the conducting beam may be switched, or commutated, from one target electrode to the next. This switching occurs upon the application of the negative portions of driving signals 72 and 74 to alternate switching grids. An output signal is obtained on line 78 when the conducting beam of the MBS tube of commutator 56 has reached its last target electrode, and this signal is used to form a conduction beam in the MBS tube of commutator 66. The out-of-phase drive signals 72 and 74 then switch this conduction beam from one target output plate of this tube to the next until a signal is obtained at line 80. This signal forms a conduction beam in the MBS tube of commutator 76, which beam is then switched, as before, by the drive signals 72 and 74 until conduction reaches the final target electrode, at which time the beam is extinguished and the cycle initiated by the application of pulse 42 to the system comes to an end.

As the conduction beams of the MBS tubes of commutators 56, 66 and 76 switch from one target electrode to the next, output pulses may be obtained from selected ones of the target electrodes, the selection being made according to the coded message output desired. As each selected target electrode receives the conduction beam of its respective MBS tube, an output pulse is applied to the line 82. When the conduction beam falls on an unselected target electrode, no output pulse is produced. Since only one target electrode at a time receives the conduction beam, the line 82 receives a pulse train 84 during the course of each cycle, the minimum time between the successive pulses of a cycle depending on the frequency of the driver oscillator 58 and the maximum time depending on the selection of target electrodes.

The pulse train 84 is carried by line 82 to the input of pulse amplifier 86, where it is amplified and inverted and then transferred, by way of line 88, to the trigger circuit and blocking oscillator 90. The cathode circuit of the blocking oscillator provides a coded message output 92 on line 94 which corresponds to the pulse train 84 which is applied to the trigger circuit, the message output pulses being of a prescribed width and amplitude.

Figure 2:
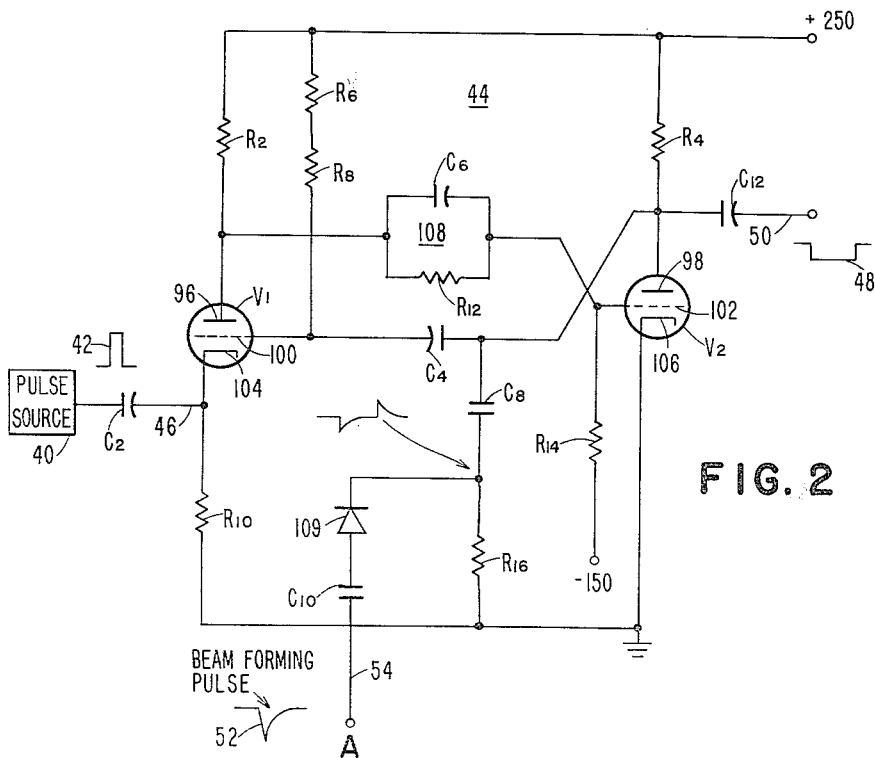
FIG. 2 is a schematic diagram of a monostable multivibrator which may be used in the system of FIG. 1.

For a more detailed description of the operation of the message generator, reference will now be made to FIGS. 2 through 9 of the drawings which are schematic diagrams of various portions of a preferred embodiment of the system set forth above. In FIG. 2 the source 40 of a pulse repetition frequency pulse 42 is shown connected through an isolating capacitor $C_2$ to the monostable multivibrator 44. The pulse 42 is applied to the cathode 45 element of tube $V_1$ of the multivibrator, and serves to trigger the multivibrator out of its stable state.

The monostable multivibrator 44 comprises triodes $V_1$ and $V_2$ connected in a conventional manner, with the triode $V_1$ being conductive in the normal, or quiescent, condition. The plate elements 96 and 98 of tubes $V_1$ and $V_2$ are connected through resistors $R_2$ and $R_4$, respectively, to a source of positive (B+) voltage. The grid electrode 100 of tube $V_1$ is connected through large resistors $R_6$ and $R_8$ to the source of B+ voltage to provide a small positive voltage on the grid. This voltage maintains tube $V_1$ in a fully conductive state. The cathode element 104 of tube $V_1$ is connected through resistor $R_{10}$ to ground. A capacitor $C_4$ links the grid 100 of tube $V_1$ to the plate element 98 of tube $V_2$, while an RC network 108, made up of resistor $R_{12}$ connected in parallel to capacitor $C_6$, links the grid element 102 of tube $V_2$ to the plate element 96 of tube $V_1$. Grid 102 is also connected through a resistor $R_{14}$ to a source of negative voltage of sufficient magnitude to maintain tube $V_2$ in its cut-off state under normal conditions. The cathode element 106 of tube $V_2$ is connected directly to ground.

Two output circuits are provided for the multivibrator 44, both of which are connected to the plate circuit of tube $V_2$. The first output circuit comprises a capacitor $C_8$ and a resistor $R_{16}$ serially connected between the plate 98 and ground to form a differentiating network. A diode 109 is connected to the junction of $C_8$ and $R_{16}$, and a capacitor $C_{10}$ links the diode to the output A by way of line 54. This output provides the beam forming pulse 52 which is fed to the commutator 56 (FIG. 1). The second output circuit connects the line 50 to the plate element 98 through a coupling capacitor $C_{12}$. This second output provides the negative gating pulse 48 which is used to trigger the grid driver oscillator 58 (FIG. 1).

The operation of the monostable multivibrator 44 may be explained as follows. In its initial or quiescent state, tube $V_1$ of the multivibrator is in a state of full conduction, the control grid 100 being at zero or at a very slightly positive potential. The circuit parameters are such as to establish triode $V_2$ below cut-off so that no current flows therethrough. Upon application of a positive pulse 42 from the pulse source 40 to the cathode 104 of triode $V_1$, current flow through this tube is reduced since the cathode 104 is made more positive with respect to plate 96. This reduction of current flow through triode $V_1$ causes a positive voltage to appear at plates 96 of the tube, which voltage is applied by way of RC network 108 to the grid 102 of triode $V_2$. This positive signal when applied to grid 102 causes tube $V_2$ to become conductive. Initiation of the current flow through triode $V_2$ produces a negative pulse at plate 98, which pulse is passed to grid 100 of triode $V_1$ through the coupling capacitor $C_4$. The full amount of this negative pulse is applied to grid 100 since capacitor $C_4$ cannot lose its charge instantaneously. The negative pulse applied to grid 100 of triode $V_1$ provides a positive feedback which acts with the pulse 42 to further reduce current through $V_1$. The reduction of current through $V_1$ produces a pulse which tends to increase current through tube $V_2$. This action continues until tube $V_1$ is driven to cutoff and tube $V_2$ is driven to a state of full conduction.

This condition, however, is not a stable one, and after an interval of time determined by the circuit parameters the multivibrator will revert to its original state. The major determinant of the duration of time during which the current will remain in its unstable condition is the rate of discharge of capacitor $C_4$. As $C_4$ discharges, the negative cut-off voltage applied to grid 100 of triode $V_1$ becomes insufficient to maintain the tube at cut-off. After a certain time then, plate current will begin to flow again in tube $V_1$, positive feedback will develop as before, and the tubes $V_1$ and $V_2$ will rapidly return to their original conditions.

When triode $V_2$ starts its conduction, its plate voltage drops sharply from its quiescent condition value to a more negative value. This more negative value is maintained until the tube $V_2$ returns to its non-conductive stage, at which time the plate voltage returns to its original value. These changing plate voltages appear on the output line 50 as the square wave pulse 48, and, after being differentiated by capacitor $C_8$ and resistor $R_{16}$, appear on line 54 as the rectified negative pulse 52.

Figure 3:
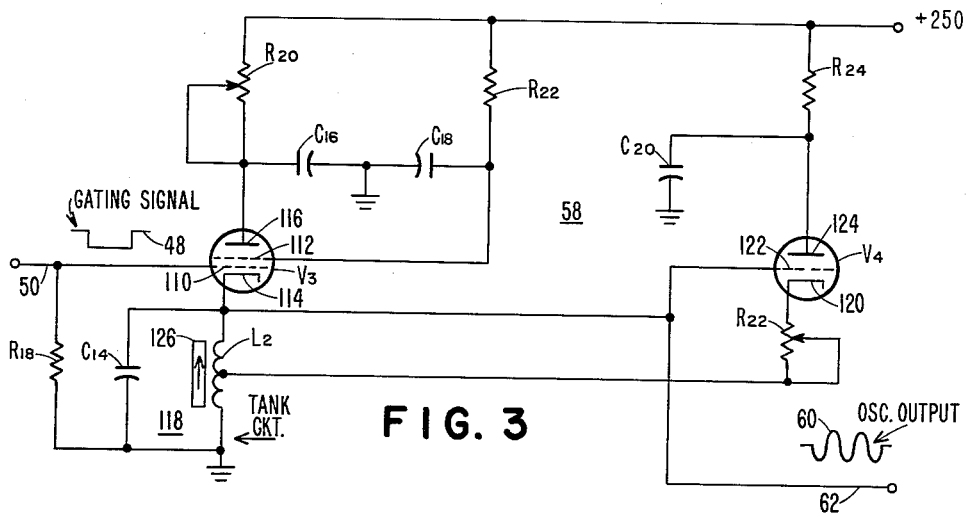
FIG. 3 is a schematic diagram of a grid driver oscillator which may be used in the system of FIG. 1.

The circuit of FIG. 3 is a schematic diagram of the grid driver oscillator 58 shown in FIG. 1. The grid driver 58 comprises a gated Hartley oscillator which provides an AC output in response to a gating signal input. The gating signal is applied by way of input line 50 to the control grid 110 of a tetrode $V_3$. The screen grid 112 of tube $V_3$ is connected through a resistance $R_{22}$ to a source of positive (B+) voltage, and is also connected through a capacitor $C_{18}$ to ground. Plate element 116 of tube $V_3$ is connected through a variable resistance $R_{20}$ to the source of B+ voltage, and is connected through capacitor $C_{16}$ to ground. A resistor $R_{18}$ is connected between control grid 110 and ground.

Connected between the cathode 114 of tetrode $V_3$ and ground is a tank circuit 118 which comprises the parallel arrangement of a capacitor $C_{14}$ and a center tap variable inductance $L_2$. Inductor $L_2$ includes a tuning slug 126 by means of which the resonant frequency of the tank circuit 118 may be varied. The center tap of inductor $L_2$ is connected through a variable resistance $R_{22}$ to the cathode 120 of an oscillator tube $V_4$. The end of the tank circuit 118 which is connected to cathode 114 of tube $V_3$ is also connected to the grid 122 of tube $V_4$ and to the output line 62. The plate element 124 of tube $V_4$ is connected through a resistor $R_{24}$ to the source of B+ voltage. Plate 124 also has an A.C. connection to ground through capacitor $C_{20}$. The tube $V_4$ and its associated tank circuit 118 comprise a conventional Hartley oscillator circuit, while the tube $V_3$ serves as a gate to turn the oscillator on and off.

In their normal condition tubes $V_3$ and $V_4$ are conductive. Quiescent current flowing in inductance $L_2$ swamps it with a fixed magnetic field preventing oscillations on the part of $V_4$. Upon application of negative gating signal 48 to the control grid 110 of tube $V_3$, that tube becomes nonconductive. This action causes the voltage across $L_2$ to suddenly be reduced thus permitting the first negative half cycle of the series of oscillations. While tube $V_3$ is cut off, oscillations will be set up by the Hartley oscillator having a frequency determined by the parameters of the tank circuit 118. These oscillations will appear on line 62 as the output signal 60, and will continue for the duration of the gating signal 48. When signal 48 comes to an end, tube $V_3$ will again go into heavy conduction, swamping inductance $L_2$ and ending the oscillations.

Figure 4A:
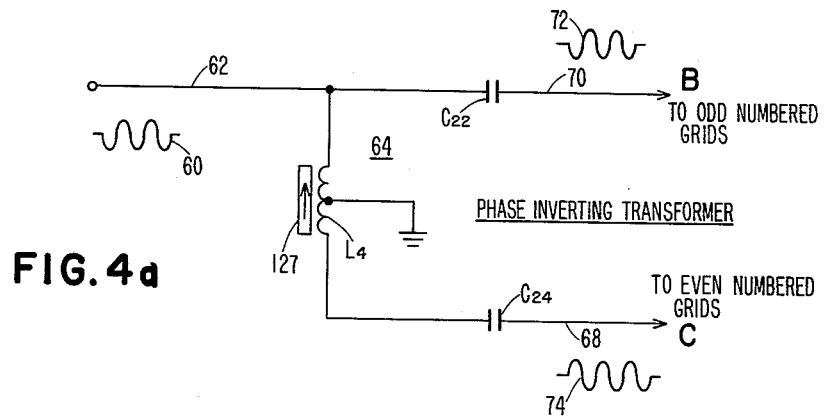
FIG. 4a is a schematic diagram of a phase inverting transformer which may be used in the system of FIG. 1.

The oscillation output signal 60 of the grid driver oscillator of FIG. 3 is applied to the input of a phase inverting transformer 64 such as that shown in FIG. 4a. The transformer of this figure is shown as an autotransformer having a center tap winding $L_4$, the center tap being connected to ground. The inductance of the transformer 64 is adjustable by means of a tuning slug 127. Transformer 64 is arranged to have two outputs, one output being obtained from the input end of the winding $L_4$ through a capacitor $C_{22}$, and the other output being obtained from the opposite end of winding $L_4$ through capacitor $C_{24}$. The output obtained on line 70 through capacitor $C_{22}$ is in phase with the input signal 60 and has the wave shape indicated at 72. The second output signal that is obtained from transformer 64 appears on line 68 and takes the shape of waveform 74. This signal is 180 degrees out of phase with the input signal 60.

Figure 4B:
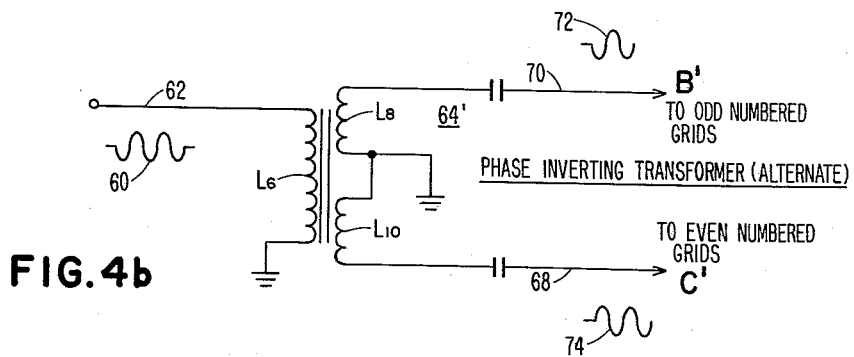

FIG. 4b shows an alternative method of obtaining the out-of-phase voltages 72 and 74. In this case the input signal 60 is applied to the primary winding $L_6$ of a multiple winding transformer. This transformer has two secondary windings $L_8$ and $L_{10}$, one end of each secondary winding being grounded. Signals 72 and 74 are obtained from secondary windings $L_8$ and $L_{10}$, respectively.

Figure 5:
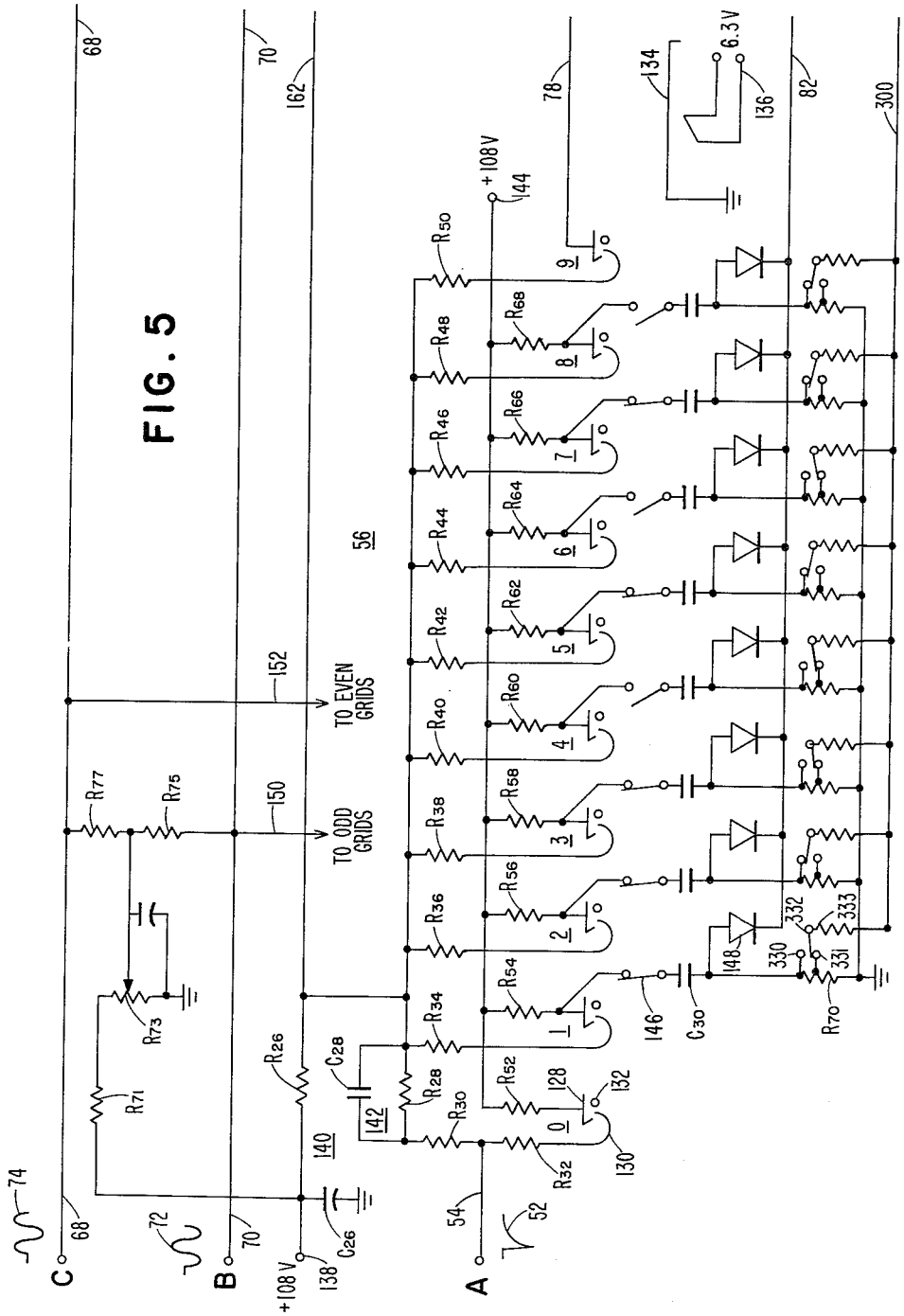
FIGS. 5, 6 and 7 are schematic diagrams of preferred embodiments of the commutators shown in the system of FIG. 1.

FIG. 5 of the drawings is a schematic representation of the commutator 56 shown in FIG. 1. The basic element of commutator 56, and the real heart of the message generator system, is a multiple-target magnetron beam switching (MBS) tube. This tube includes ten positions or arrays indicated by the numbers 0 through 9 of FIG. 5. Each array has a target electrode, indicated at 128 of the "0" array, a spade electrode, indicated at 130 of the "0" array, and a switching grid electrode, indicated at 132 of the "0" array. In an MBS tube, these arrays are usually aligned radially about a central cathode element. However, for the sake of simplicity, the arrays of the MBS tube shown in FIG. 5 have been arranged in a line, with the cathode element and its associated heater indicated at 134 and 136, respectively.

An axial magnetic field is produced within the envelope of an MBS tube by means of a small cylindrical magnet permanently bonded to the outer surface of the envelope.

The various electrodes of each position, or array, of an MBS tube have certain characteristics which enable the tube to (1) form an electronic beam, (2) automatically lock the beam, (3) give a constant current output, (4) switch the beam, and (5) clear the beam. Thus, a tube may be in a cleared, or cutoff, condition, or an electron beam may be formed at any one of the ten positions and then may be switched sequentially or at random from one position to another.

When power is first applied to an MBS tube, it is in its cutoff condition unless provision has been made for the formation of a beam. The spade element of each position is connected through an individual series resistance to a common source of supply voltage. The application of this voltage to the spade elements creates an electric field within the MBS tube. The presence of this electric field in combination with the axial magnetic field created by the externally mounted cylindrical magnet causes each spade element to exhibit a negative resistance characteristic. By sufficiently lowering the potential of a selected spade element, an electron beam may be formed at a selected array. Once the beam is formed, the negative characteristic of the spade associated with the conductive array will cause the beam to "lock in" at that position. The spade element will then stabilize at a potential near that of the cathode element, that is, near zero voltage. The remaining electrodes of the conductive array remain at a high positive potential. Either a negative D.C. voltage or a high speed negative pulse may be used to lower the potential of a spade element and thus to trigger beam formation.

When an electron beam has been formed at a given position, it can remain there indefinitely, or it can be advanced to other positions. There is a great variety of ways in which such an advance may be accomplished. However, since the present application is concerned with a sequential switching arrangement, only this method will be discussed. For information concerning other modes of operation for the MBS tube, reference should be made to a publication by the electronic tube division of the Burroughs Corporation, Plainfield, New Jersey, entitled "Criteria for Selection of the Magnetron Beam Switching Tube as a Circuit Component," by Saul Kuchinsky. Reference should also be made to an article entitled "Low Voltage Beam Switching Tube" by Rudolph A. Cola which appeared in the September 1, 1956, issue of Electronic Design, pages 22 through 25.

To cause the electron beam to switch from one position to the next, the voltage on the switching grid of the conducting array is lowered to a value where it will change the electric field in the area between arrays to a sufficient extent that some of the beam is diverted to the next, or leading, spade. When enough of the beam is diverted to the leading spade, that spade's potential drops to the level of the cathode element. There then exists an instantaneous condition in which two spades, the leading and the lagging, are both near zero potential. This instantaneous condition changes the spade characteristics in such a manner that the beam will switch entirely to the new position, the leading spade assuming its locked in stable state. The lagging spade then automatically cuts itself off.

In each array the electron beam is affected only by the individual grid element with which it is associated. Switching pulses applied to switching grids other than the one included in the conducting array will cause no change in the beam. In order to obtain the single position sequential stepping utilized in the present invention, the grid elements of the MBS tube are connected in two groups, the odd numbered grids in one group and the even numbered grids in the other. One input signal is applied to the first group and another is applied to the second group. In this way, almost any type of switching input, such as D.C. (push-pull), sine wave, flip-flop or discrete pulse may be used to obtain the desired effect. The grid element is normally used for this type of sequential switching since it performs its function without drawing an appreciable amount of current and since, because of its shape and position, it effects a very uniform switching. The switching action can be as fast as 0.1 microsecond. The polarity of the magnetic field determines the direction of sequential switching.

The target electrode element of the magnetron beam switching tube provides a constant current output of 80 to 90 percent of the beam current to an external load. As the conduction beam of the tube is sequenced from position to position, succeeding target elements will provide output signals.

As illustrated in FIG. 5 of the drawings the MBS tube which is used in commutator 56 has the spade element 130 of position 0 connected to a source of positive voltage at terminal 138 through filter network 140, RC network 142, and resistors $R_{30}$ and $R_{32}$. Filter network 140 includes a series resistor $R_{26}$ and a shunt capacitor $C_{26}$, while the RC network 142 comprises the parallel arrangement of capacitor $C_{28}$ and resistor $R_{28}$. The spade elements of the remaining positions 1 through 9 of the MBS tube are connected through individual resistors $R_{34}$, $R_{36}$, $R_{38}$, $R_{40}$, $R_{42}$, $R_{44}$, $R_{46}$, $R_{48}$ and $R_{50}$, respectively, and through the filter network 140 to the common voltage source at terminal 138. The target elements of positions 0 through 9 are connected through individual series resistances $R_{52}$, $R_{54}$, $R_{56}$, $R_{58}$, $R_{60}$, $R_{62}$, $R_{64}$, $R_{66}$ and $R_{68}$, respectively, to a common source of positive voltage at terminal 144. The source of bias voltage which is connected to terminal 138 and supplies the spade electrodes also supplies a bias voltage to the grid elements of the MBS tube. The grid elements of the odd numbered positions are connected to the bias source through resistor $R_{71}$, variable resistor $R_{73}$ and resistor $R_{75}$. The grid elements of the even numbered positions are connected to the bias source through resistor $R_{71}$, a portion of variable resistor $R_{73}$ and resistor $R_{77}$. By obtaining both the spade element bias and the grid element bias from the same voltage supply the proper voltage relationship between these two elements is insured even if comparatively large variations in the supply source should occur.

Connected to the target element of position 1 through an output, or target element, switch 146, a differentiating network comprising a series capacitor $C_{30}$ and a shunt resistor $R_{70}$, and a rectifying diode 148 is an output line 82. In a similar manner the target element of each of positions 2 through 8 is connected through an individual switch, an individual differentiating network, and an individual rectifying diode to the output line 82. No connection is made between the 0 array and the output line or between the 9 array and the output line, since the 0 array is used only for establishing the electron beam and the 9 array is used to supply the second commutator circuit 66 (FIG. 1) with a beam forming pulse on line 78.

Formation of the beam in the MBS tube is accomplished by means of the beam forming pulse 52, which is applied to spade element 130 by line 54. Pulse 52 originates in the monostable multivibrator 44, and is applied to the MBS tube at the junction of resistors $R_{30}$ and $R_{32}$. At points B and C of FIG. 5 are shown the out-of-phase voltages 72 and 74 which originate at the phase inverting transformer 64 and are applied to the switching grids of the MBS tube.

Figure 6:
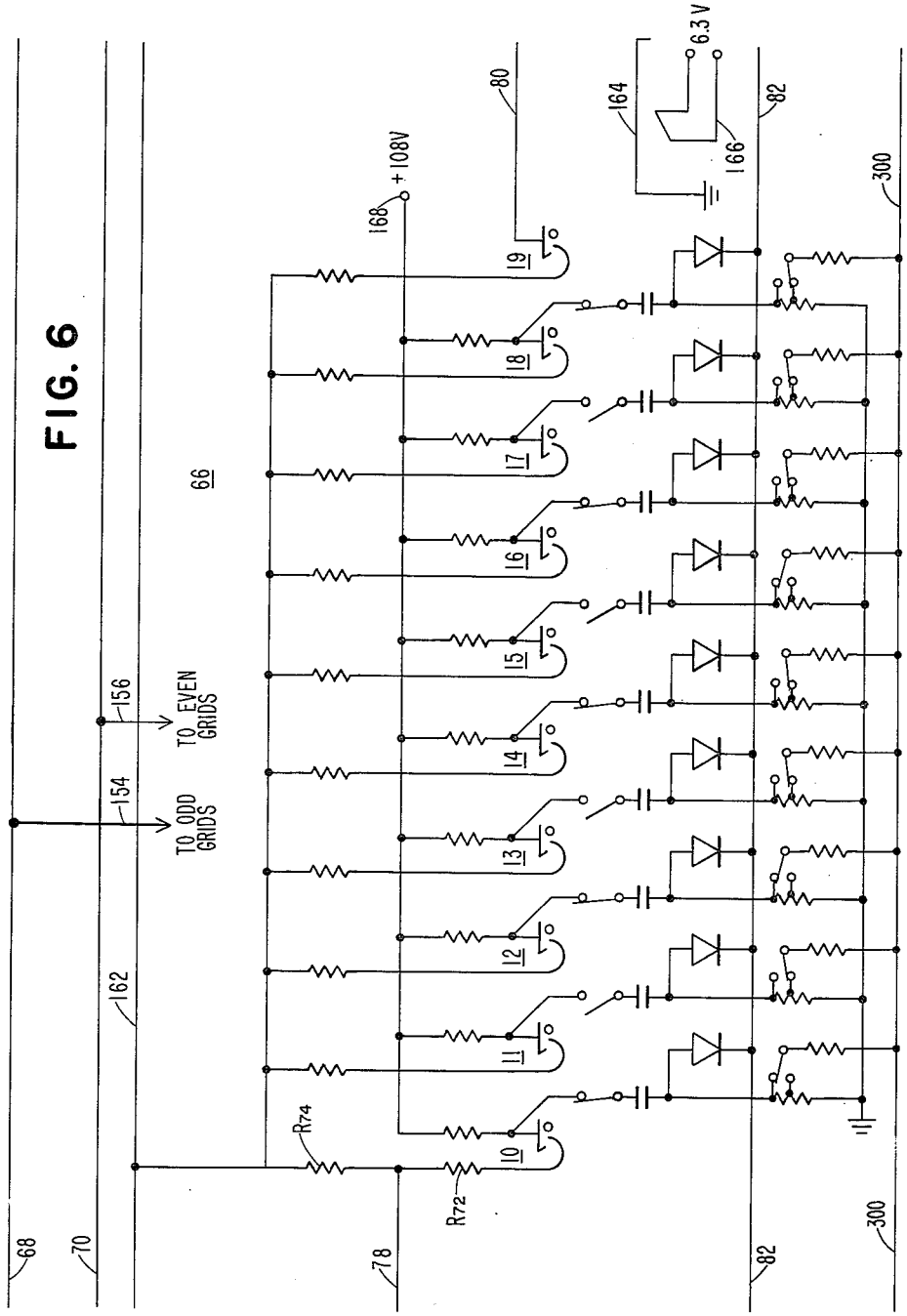

FIG. 6 of the drawings is a schematic diagram of the commutator 66 shown in FIG. 1c. As may be seen, the circuitry of this commutator is very similar to that of commutator 56. The MBS tube has ten positions, labeled 10 through 19, each of positions 10 to 18 being connected through individual switches, individual differentiating networks and individual rectifier diodes to the output line 82. The output of position 19 is connected through line 80 to the commutator 76 (FIG. 1) to supply a beam forming pulse thereto. The MBS tube of commutator 66 includes a cathode element 164 with its associated heater element 166. The spade element of position 10 is connected through resistors $R_{72}$ and $R_{74}$, through line 162, and through filter network 140 to the source of positive bias voltage at terminal 138 of FIG. 5. The spade elements of positions 11 through 19 are connected through individual series resistances to the line 162 and thence to the terminal 138. The grid elements of the even numbered positions are connected through line 156, line 70, and resistors $R_{75}$, $R_{73}$ and $R_{71}$ (FIG. 5) to the bias source terminal 138. Similarly, the grid elements of the odd numbered positions of the MBS tube of commutator 66 are connected through line 154, line 68, resistors $R_{77}$, $R_{73}$ and $R_{71}$ to the terminal 138. The target elements of positions 10 through 18 are connected through individual series resistances to a common source of positive potential at terminal 168, while the target element of position 19 is connected through line 80 to the MBS tube of commutator 76 (FIG. 1) to provide a beam forming pulse thereto. Line 78, which carries a beam forming pulse from position 9 of the MBS tube of commutator 56 to the MBS tube of commutator 66 is connected between resistors $R_{72}$ and $R_{74}$.

Figure 7:
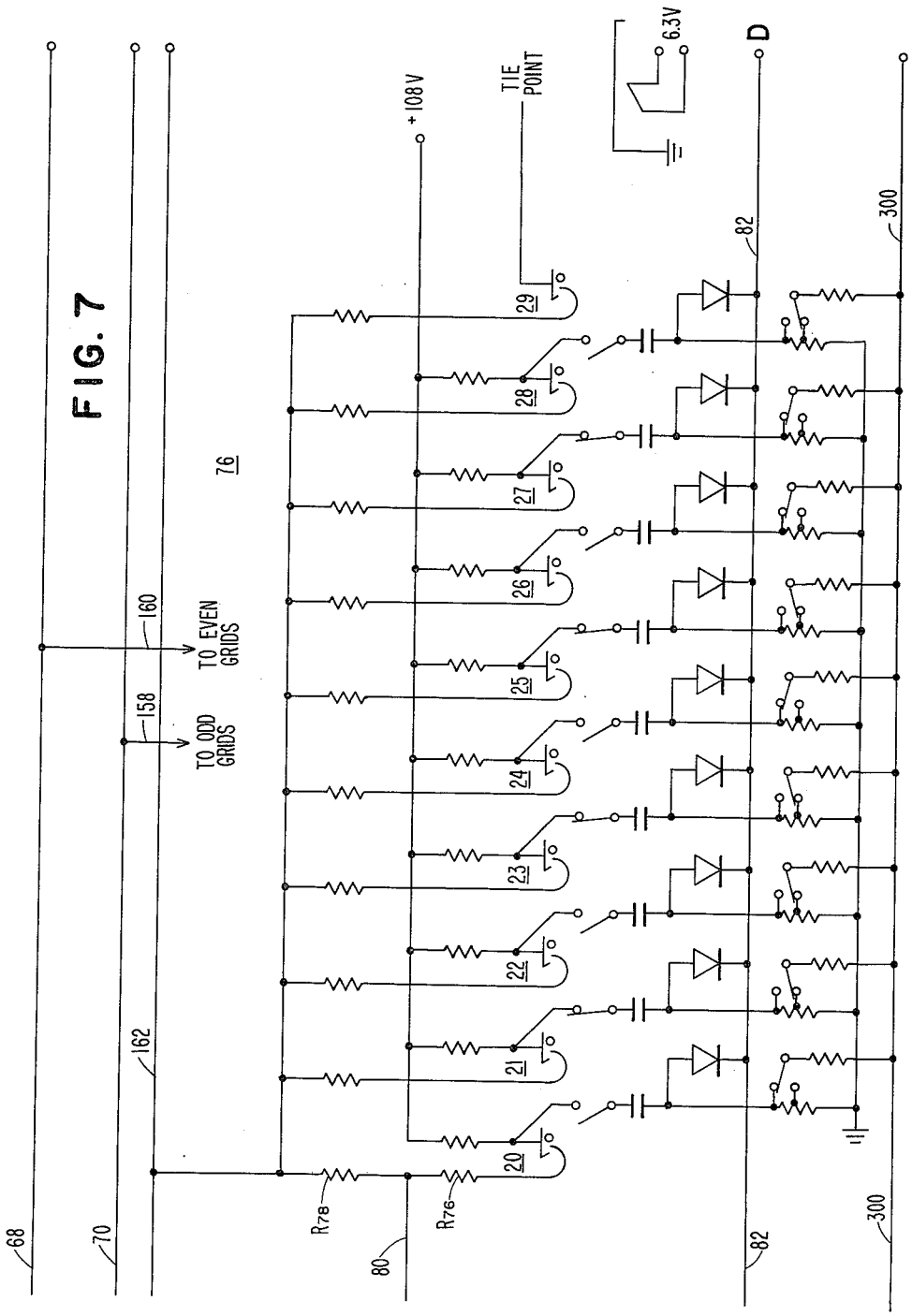

A schematic diagram of the commutator 76 is shown in FIG. 7. As is apparent from the drawings, the commutator 76 is identical to the commutator 66. The ten positions of the MBS tube of commutator 76 are numbers 20 through 29, with the target elements of positions 20 through 28 being arranged to provide output signals to the output line 82. The beam forming pulse from position 19 of the MBS tube of commutator 66 is applied to position 20 of the MBS tube of commutator 76 between resistors $R_{76}$ and $R_{78}$. The output signal from the target electrode of position 29 may be applied to another commutator if greater capacity is desired for the system, or it may be left unconnected so as to extinguish the conducting beam upon commutation of the beam away from position 29.

Figure 10:
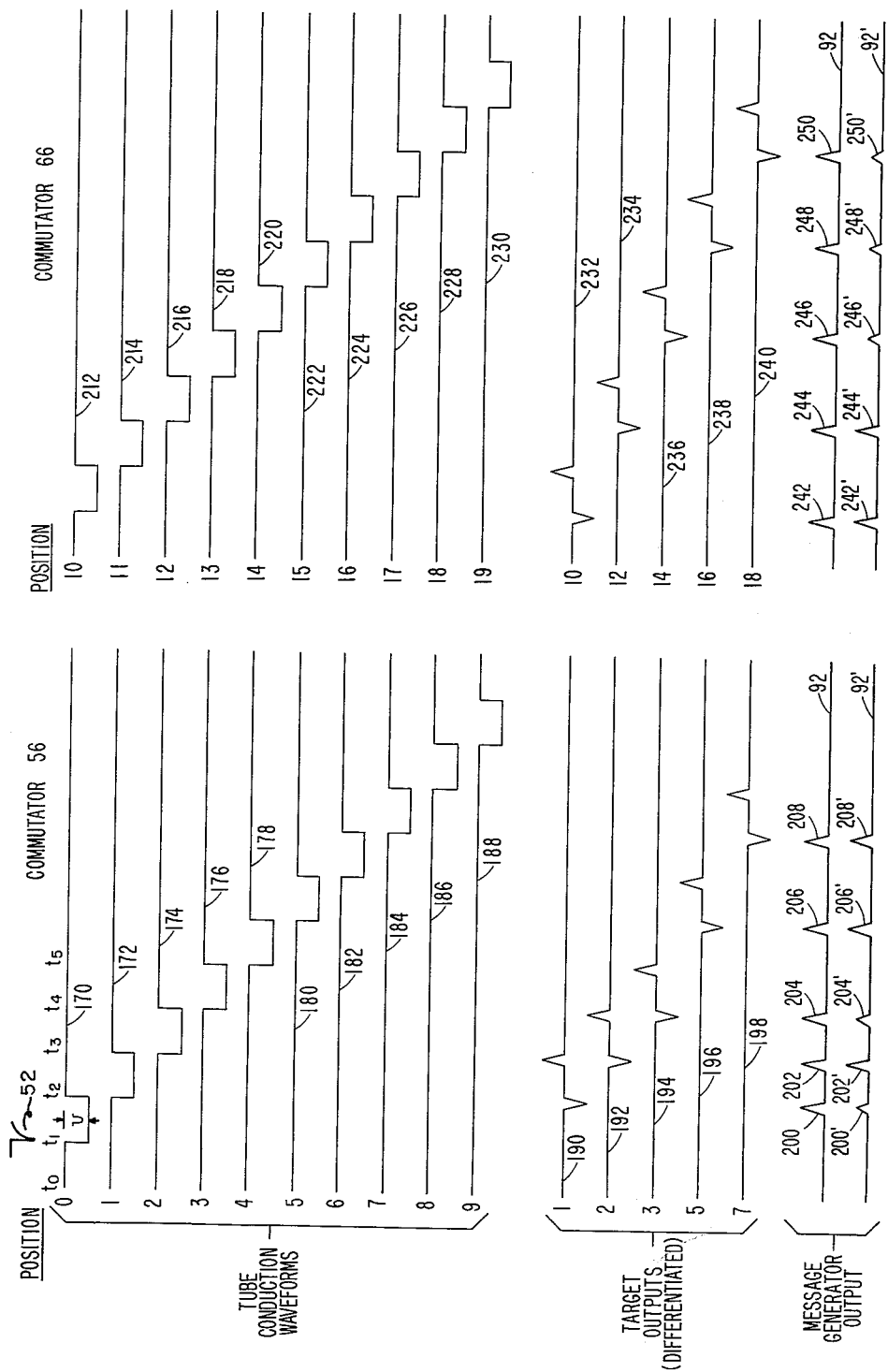
FIG. 10 is a graphical showing of output waveforms.

The operation of the three commutators 56, 66 and 76 will now be considered in conjunction with graphs of FIG. 10. Upon the application at point A of a beam forming pulse 52 to the spade element of the MBS tube of commutator 56, an electron beam is formed between the cathode 134 and the target element 128. After the formation of the conduction beam at position 0, the out-of-phase voltages 72 and 74 are applied to the switching grids of the odd numbered MBS tube positions and to the even numbered switching grids, respectively. Since, as has previously been mentioned, the conduction beam will switch from one position to the next when a negative voltage is applied to the switching grid of the conducting position, the beam which was initiated at position 0 will switch to position 1 upon the application of a negative half cycle of the alternating signal 74. Although the switching grids of positions 2, 4, 6 and 8 will have the same negative signal applied to them, this will have no effect upon the beam since it is affected only by the individual grid with which it is associated. The wave shape of the voltage drop across resistor $R_{52}$ due to the current output of the target electrode of position 0 is shown at 170 of FIG. 10. At the initiation of the conducting beam at time $t_1$ the voltage across resistor $R_{52}$ abruptly changes from the quiescent positive level to a lesser value. The voltage drop across this resistance is maintained until time $t_2$, at which time the conduction beam is switched from position 0 to position 1, cutting off the current through resistor $R_{52}$ and initiating current through resistor $R_{54}$. This causes a voltage drop to appear across resistor $R^{54}$ which is indicated by the waveform 172 of FIG. 10.

Since, as has been pointed out, the position 0 is utilized only for the purposes of initiating the conducting beam of the MBS tube of commutator 56, no output signal was obtained from this position. However, position 1 is connected to the output line 82 through the switch 146 and the differentiating network $C_{30}$ and $R_{70}$. Assuming switch 146 to be closed, the sudden change in voltage across resistor $R_{54}$ is applied to the differentiating network which produces the negative pulse shown on waveform 190 of FIG. 10. This negative pulse passes through the diode 148 to the output line 82.

At time $t_3$ the input signal 72 reaches its negative half cycle, applying a negative voltage to the switching grids of the odd numbered positions of the MBS tube. The negative signal thus applied to the switching grid of position 1 causes the conducting beam to switch to position 2, causing a voltage to appear across resistor $R_{56}$ and causing the voltage across resistor $R_{54}$ to rise to its more positive quiescent level, as indicated by waveforms 172 and 174 of FIG. 10. The removal of the negative voltage from resistor $R_{54}$ causes the differentiating network associated with position 1 to produce the positive going pulse shown on waveform 190. The rectifying diode 148 prevents this pulse from reaching the output line 82. Assuming the output switch of position 2 to be closed, the negative going voltage appearing across resistor $R_{56}$ is differentiated, producing the negative going pulse of waveform 192, which passes through a rectifier to the output line 82.

At time $t_4$ the alternating signal 74 again reaches its negative half cycle, causing the conduction beam to switch from position 2 to position 3. The cessation of conduction at position 2 produces in the differentiating network the positive pulse of waveform 192, which pulse is prevented from reaching output line 82 by a rectifier. As was the case with positions 1 and 2, the switching of the conduction beam to position 3, as indicated by the waveform 176, results in the production of the negative pulse of waveform 194, it being assumed again that the output switch is closed. The negative pulse shown on waveform 194 then appears on output line 82. When the alternating input 72 reaches its next negative half cycle at time $t_5$, the conduction beam is switched from position 3 to position 4. It is now assumed that the output switch associated with position 4 is open, thus preventing application of the voltage across resistor $R_{60}$ to the differentiating network associated with position 4. Therefore, the switching of the conduction beam to position 4 does not result in an output signal on line 82. The output switch associated with position 5 being assumed to be in a closed position, the next output pulse does not appear on line 82 until the conduction beam is switched to position 5. Similarly, since the output switches of positions 6 and 8 are shown to be open, no output signals will be obtained on line 82 when the conduction beam is switched in turn to these positions.

It is apparent, then, that by opening and closing various combinations of output switches, the pulse train 84 appearing on line 82 may be arranged to provide a coded message output. The coded pulse train may be made of any desired length simply by cascading the appropriate number of commutators. In the illustrated embodiment of the invention three such commutator devices have been cascaded. To accomplish this cascading the final position of the MBS tube of the first commutator is connected to the spade element of the first position of the MBS tube of the second commutator. Thus, as is illustrated in FIGS. 5 and 6, the target element of position 9 (FIG. 5) is connected by way of line 78 to the junction of series resistors $R_{72}$ and $R_{74}$ which are in the bias circuit of the spade element of position 10 (FIG. 6). When the conduction beam of the MBS tube of commutator 56 reaches position 9 a beam forming pulse immediately passes to the spade element of position 10, initiating a conduction beam in the MBS tube of commutator 66. Upon initiation of this beam, the position 9 beam is extinguished, leaving the MBS tube of commutator 56 in a cleared or cut-off condition. The out-of-phase voltages 72 and 74 then operate to commutate the conduction beam in the MBS tube of commutator 66 sequentially from position 10 through the intermediate positions to position 19. This sequential shifting produces the waveforms indicated at 212, 214, 216, 218, 220, 222, 224, 226, 228 and 230, across the target element resistances of the respective positions. With the output switches opened or closed in the order shown the differentiating networks of positions 10, 12, 14, 16, and 18 will produce the output waveforms shown at 232, 234, 236, 238 and 240 of FIG. 10. The negative pulses of these waveforms will pass through their respective diodes and will appear on the output line 82.

Upon commutation of the conduction beam from position 18 to position 19 of the MBS tube of commutator 66 a beam forming pulse will be applied by way of line 80 to the junction of series resistors $R_{76}$ and $R_{78}$ in the spade electrode circuit of the first position of the MBS tube of commutator 76. The application of this pulse causes a beam to form at position 20 of this MBS tube and the conduction beam of position 19 extinguishes itself. As before, the out-of-phase alternating signals 72 and 74 will commutate the conduction beam sequentially from position 20 through the intermediate positions to position 29, producing output signals on line 82 in accordance with the arrangement of the output switches of the respective positions. When the beam reaches position 29 it is extinguished, leaving all the MBS tubes in a cleared condition and ready for the next succeeding cycle.

Figure 8:
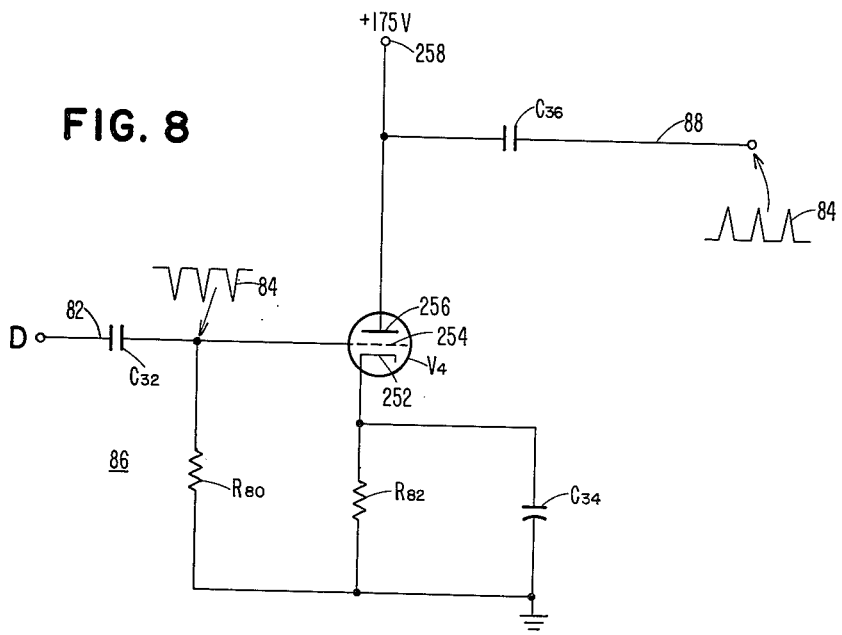
FIG. 8 is a schematic diagram of a pulse amplifier which may be used in the system of FIG. 1.

The pulse train output obtained from the commutator devices 56, 66 and 76 is fed by way of line 82 to a pulse amplifier 86 which is shown in detail in FIG. 8 of the drawings. The pulse amplifier 86 comprises a vacuum tube triode $V_4$ having a cathode element 252, a grid element 254 and a plate element 256. The pulse train 84 is applied to the grid element 254 through a capacitor $C_{32}$. Grid element 254 is connected to ground through a grid leak resistor $R_{80}$, while the cathode element 252 is connected to ground through a resistor $R_{82}$ and a bypass capacitor $C_{34}$. The plate element 256 is connected to a + voltage source at terminal 258 and is also connected through a capacitor $C_{36}$ to the output line 88. The pulse amplifier serves to amplify the train of output pulses 84 obtained from the commutators and also serves to invert them.

Figure 9:
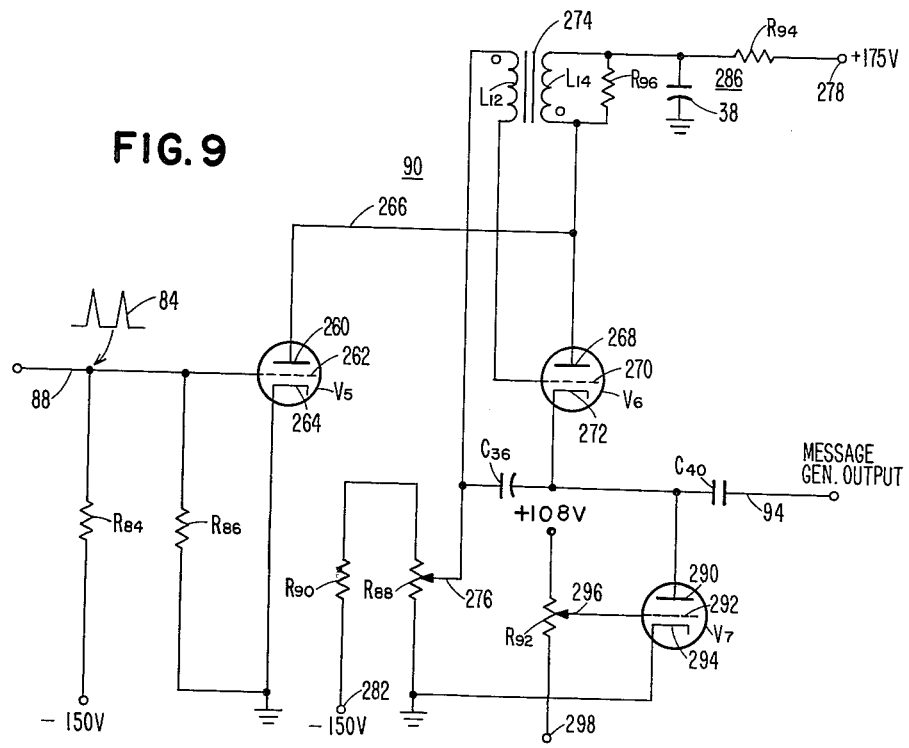
FIG. 9 is a schematic diagram of a trigger and blocking oscillator which may be used in the system of FIG. 1.

The amplified and inverted pulse train 84 is applied by way of line 88 to a trigger circuit and blocking oscillator 90 shown in detail in FIG. 9. The trigger includes a vacuum tube triode $V_5$ having plate, grid and cathode elements 260, 262, and 264, respectively. The grid element is connected through a resistor $R_{84}$ to a source of negative bias voltage and through a grid leak resistor $R_{86}$ to ground. The cathode element 264 of tube $V_5$ is connected directly to ground. The grid bias source drives tube $V_5$ well into its cutoff condition. The application of individual pulses of pulse train 84 to the grid element 262 is sufficient to drive tube $V_5$ to its conductive state, and thus to produce triggering pulses on line 266. Each pulse of the pulse train 84 produces an individual triggering pulse.

The blocking oscillator shown in FIG. 9 includes the triode $V_6$ having plate grid and cathode elements 268, 270 and 272, respectively. The grid element 270 is connected through the primary winding $L_{12}$ of transformer 274 to the variable tap 276 of resistor $R_{88}$. One end of this resistor is connected to ground while the other end is connected through resistor $R_{90}$ to a source of negative potential at terminal 282. This source of voltage supplies a variable negative bias to the grid element 270. Cathode element 272 of tube $V_6$ is connected through a triode $V_7$ which acts as the cathode resistance to ground and is also connected through a capacitor $C_{36}$ to the movable contact 276. The plate element 268 of tube $V_6$ is connected through the secondary winding $L_{14}$ of transformer 274 and through a filter network 286 comprising capacitor $C_{38}$ and resistor $R_{94}$ to a source of positive bias voltage at terminal 278. A shunt resistor $R_{96}$ is connected across the secondary winding $L_{14}$ of transformer 274.

The triode $V_7$, which is connected in the cathode circuit of tube $V_6$, includes a plate element 290, a grid 292 and a cathode 294. The plate element 290 is connected to the cathode 272 of triode $V_6$; the cathode element 294 is connected directly to ground. Grid element 292 is connected to the movable arm 296 of a potentiometer $R_{92}$.

One end of the potentiometer is connected to a source of positive potential which acts to maintain triodes $V_7$ in a conductive state, the other end is connected to a terminal 298. When triggering signals are applied to the plate element 268 of tube $V_6$, this tube becomes conductive, the tube $V_7$ forming part of its current path. Since triode $V_7$ acts as a cathode resistance for triode $V_6$, output signals may be obtained from the cathode element 272 through capacitor $C_{40}$ on output line 94. The amplitude of such output signals is determined by the resistance presented by triode $V_7$, which resistance may be varied by adjusting the setting of potentiometer arm 296 or by applying signals to terminal 298.

Oscillator tube $V_6$ is normally maintained in its cut-off condition by the negative voltage applied to the grid element 270. When the triggering pulses which appear on line 266 are applied to the plate circuit of $V_6$ this tube conducts, the pulses being of sufficient magnitude to overcome the effect of the cut-off bias. As the plate current increases in response to the trigger signal, there is a voltage developed across both windings $L_{12}$ and $L_{14}$ of the transformer 274. These windings are so connected that the increase in current in the plate winding $L_{14}$ causes the grid to cathode voltage to increase. This action causes the plate current to increase still more and causes the plate to cathode voltage to decrease. This regenerative action continues until the grid potential has reached such a high value that, because of tube non-linearities, the rate of change of plate current becomes zero and then reverses. The latter action starts a decrease of grid voltage which, because of the feedback action, is also cumulative and the tube is rapidly cut off. During the time of conduction of the tube $V_6$ an output voltage appears on line 94. The length of time that the tube conducts, and thus the width of the output pulse, is determined largely by the characteristics of the transformer and the properties of the tube in the positive grid voltage region. Each time the blocking oscillator is triggered on by a triggering pulse on line 266, an output pulse is obtained on line 94, each output pulse having a standard width and having an amplitude which corresponds to the degree of conductivity of triode $V_7$. If the degree of conductivity of tube $V_7$, and thus its resistance, remains constant then each output pulse will have a standard, predetermined, amplitude. If the potentiometer arm 296 should be moved during the generation of a train of output pulses, the amplitude of these pulses will vary. Similarly, if modulating signals are applied to terminal 298 which modify the conductivity of tube $V_7$, the amplitude of the output signals on line 94 will be similarly modified.

Since each of the triggering pulses which appear on line 266 depends upon the presence of an input pulse from the pulse train 84, the spacing of the output pulses on line 94 will be substantially the same as the spacing of the pulses of pulse train 84. This output pulse train which appears on line 94 is shown in FIG. 10 as the waveform 92. As may be seen in this figure the pulses appearing on train 92 correspond in time to the occurrence of the negative pulses which appear at the differentiating networks associated with the various commutator positions. Thus, the output pulse 200 corresponds in time with the negative pulse of waveform 190. Output pulse 202 corresponds in time with the negative pulse shown in waveform 192 and output pulses 204, 206 and 208 correspond with the negative output pulses shown in waveforms 194, 196 and 198, respectively. Similarly, the output pulses 242, 244, 246 and 248 and 250 correspond in time to the appearance of negative pulses on waveforms 232, 234, 236, 238 and 240 which are produced by the commutator 66. It having been assumed that the cathode resistance of tube $V_6$ remains constant, the amplitude of the output pulses in pulse train 92 is constant. Thus there may be produced an output train 92 having pulses of standard width and amplitude which represent the coded message set up in the commutator device 56, 66 and 76 by means of the output switches shown in FIGS. 5, 6 and 7.

In certain instances, however, it might be desirable to provide more information on the output pulse train 92 than can be obtained merely by varying the spacing between succeeding pulses. In this case, the additional information may be impressed upon the pulse train by varying the amplitude of the individual pulses. Such a variation may be obtained by applying modulating signals to the terminal 298 (FIG. 9) to vary the conductivity of tube $V_7$, as has been suggested above. Such pulses may be obtained from any desired source. One such source is the differentiating resistors (FIG. 5) which appear in the differentiating networks connected to the target electrodes of the commutators 56, 66 and 76. The differentiating resistor $R_{70}$, for example, may be provided with a plurality of taps such as those indicated by the numbers 330 and 331. A contact arm 332 is provided to allow a line 300 to be connected to one of the taps. Although two taps are shown in this illustration, it will be apparent that any number of taps may be employed and that a potentiometer may be substituted for the tapped resistor if it is so desired. When output pulses are caused to appear across resistor $R_{70}$ by the starting and ending of conduction at the target electrode of position 1, output pulses will be fed through contact arm 332 and summing resistor 333 to the line 300. These pulses will correspond in shape to those shown in waveform 190 of FIG. 10. However, the amplitude of these positive and negative pulses will depend upon the position of contact arm 332. If contact is made with terminal 331, as shown in FIG. 5, only a portion of resistor $R_{70}$ will be tapped and consequently only a portion of the voltage appearing across this resistance will be fed to line 300. If, on the other hand, tap 330 is connected to line 300 the full voltage appearing across resistance $R_{70}$ will be applied to line 300. Thus two discrete voltage amplitudes may be obtained, depending upon the setting of contact arm 332. Similarly, taps, contact arms and summing resistors may be provided for the differentiating resistors of each position of the commutators 56, 66 and 76, the pulses obtained from each position corresponding in time to the target electrode output pulses of their associated MBS tube arrays. The amplitude of the pulses applied to line 300 will be dependent in each case upon the position of the respective contact arms. Since, in the embodiment illustrated in FIGS. 5, 6 and 7 only two taps have been provided on the differentiating resistance, only two amplitudes are available for the pulses appearing on line 300. These two amplitudes may be selected to represent binary ones and binary zeros, respectively. The positive and negative pulses appearing on line 300 may be applied to terminal 298 (FIG. 9) and thence to the grid 292 of triode $V_7$. The negative pulses appearing on line 300 will tend to reduce the conductivity of the triode $V_7$, the greater the amplitude of the negative pulses the greater the increase in resistivity of the triode. Due to the fact that the triode $V_6$ is biased to cut off and only conducts upon the application of the trigger pulse on line 266, it is only at this time that the tube $V_7$ can conduct and thus it is only at this time that an output can be obtained on line 94. As was mentioned above, and as may be seen from the target output waveforms of FIG. 10, both positive and negative pulses appear on line 300. However, as has been set forth above, only the negative pulses of the target output waveforms appear on line 82. Since it is these negative pulses which, after inversion and amplification, are applied to the triode $V_6$ by way of line 266, it is only during the time at which the negative target output pulses are produced that the tube $V_6$ is triggered to conduction. Therefore, it is only the negative signals on line 300 which have any effect on the amplitude of the message generator output appearing on line 94. The pulses appearing on line 300 cause the tube $V_7$ to take on one of two conditions of resistivity, one condition occurring upon the presence of a pulse of small amplitude, the other condition occurring upon the presence of a pulse of greater amplitude. The former pulse produces a plate resistance of lesser magnitude, while the latter pulse results in a larger resistance. Since the pulses appearing on line 300 are automatically synchronized with the pulses appearing on line 82, the resistivity of tube $V_7$ is automatically adjusted, or modulated, in accordance with the position of the contact arm associated with that array of the MBS tube which is conducting. Since the output pulse appearing on line 94 depends upon the resistance of tube $V_7$, the amplitude of this output pulse will correspond to the setting of the contact arms. Thus, for example, the waveform 92' of FIG. 10 shows a modification of the waveform 92 which may be produced by setting the contact arms in the manner shown in FIGS. 5 and 6. Thus, with the contact arm 332 (FIG. 5) in its downward position, the output pulse 200' is of small magnitude while the pulse 202' is of relatively greater magnitude due to the fact that the contact arm associated with array 2 of commutator 56 is in its upper position. In a similar manner the amplitudes of pulses 204', 206', 208', 242', 244', 246', 248' and 250' correspond to the positions of their respective contact arms.

It should be noted that if more than two contacts are provided on the differentiating resistors, more than two amplitudes for the output pulses may be selected. It should also be noted that if only constant amplitude output pulses are desired on line 94 the tube $V_7$ may be replaced by a resistor of such a value as to give the desired amplitude output.

Figure 11:
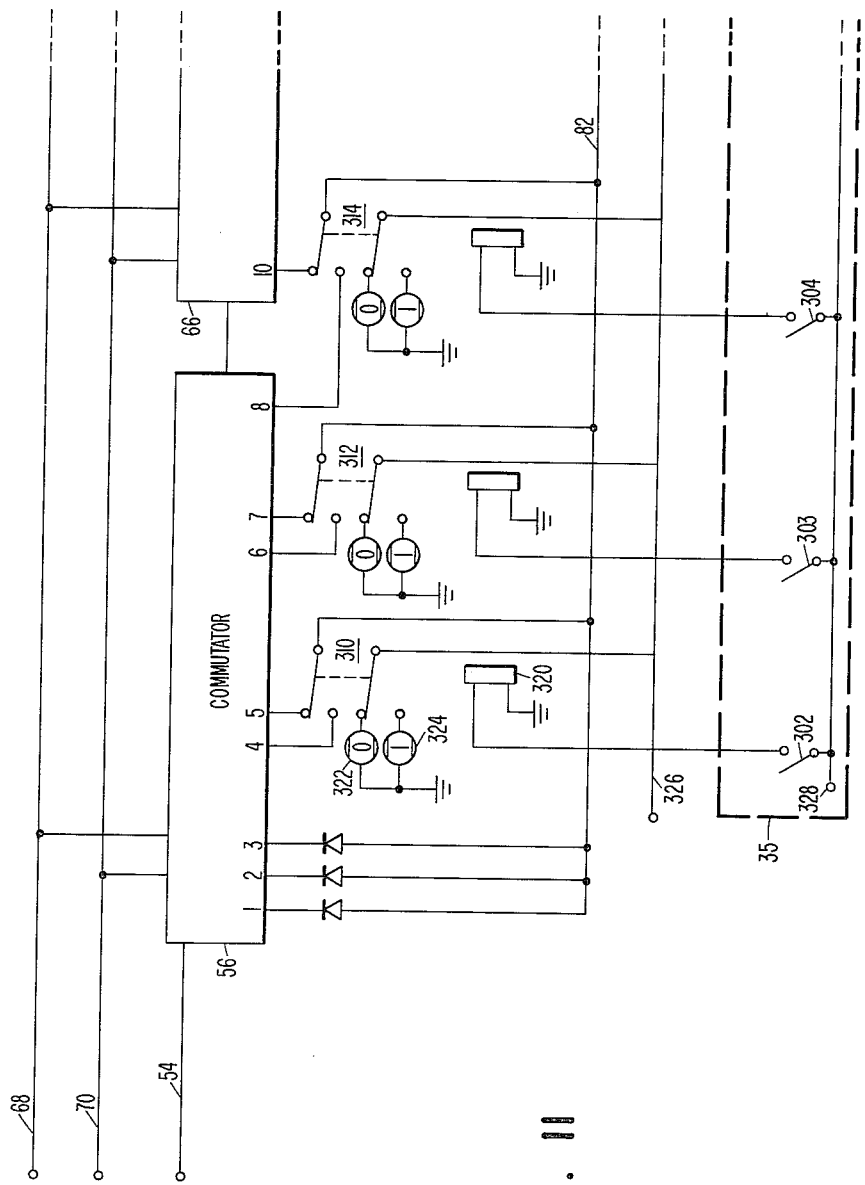
FIG. 11 is a schematic showing of one method of controlling the output switches of the commutators shown in FIGS. 5, 6 and 7.

Referring now to FIG. 11, one method of operating the target electrode switches such as the one indicated at array 1 of the commutator 56 by the number 146 is shown. In this illustration, it will be assumed that the switches are arranged so as to be suitable for use in the simulator system described with respect to FIG. 1a. As has been indicated, the first three positions of the commutator 56 are used to provide the synchronizing pulses which make up the first portion of the message. Since these three pulses are present in each message generated in this particular embodiment, positions 1, 2 and 3 are permanently connected to the output line 82. Thus the target electrode switches of these three positions are permanently closed. The remaining positions of the commutators 56, 66 and 76 are connected in pairs, with the exception of those positions utilized in transferring the conducting beam from one tube to the next and with the exception of the final position, which produces a trigger pulse. As may be seen in FIG. 11 the target electrode switches of each pair are so interconnected as to prevent more than one position of each pair from providing an output pulse during the generation of any given message. Thus, the switches of positions 4 and 5 are ganged together as indicated at 310 and are operated by a relay coil 320. The relay 320 is operated by a switch 302 in the instructor's panel 35 (FIG. 1b). As set up in the illustration, each pair of positions is arranged to represent a binary digit. When the ganged switches 310 are in their normal position, as shown, the target electrode of array 5 is connected to the output line 82 while the target electrode of array 4 remains unconnected. This condition may be arbitrarily designated as representing a binary zero. A portion of switch 310 may be utilized to connect an indicating light 322 to a source of voltage connected to the terminal 326. Upon closure of switch 302, relay coil 320 is connected to a source of voltage at terminal 328, energizing the coil and causing the switches 310 to change positions, disconnecting position 5 of the commutator from the output line 82, connecting position 4 of the commutator 4 of the output line and connecting indicator light 324 to terminal 326.

In a similar manner switches 312 and 314 may be operated by the closure of switches 303 and 304, respectively. In this manner, the desired combination of output pulses may be obtained from the commutators 56, 66 and 76. The indicator lights for each position may be located on the instructor's panel 35 as indicated in FIG. 1b to provide a remote indication of the condition of these various target electrode switches. It will be obvious to those skilled in the art that any desired method of operating the target electrode switches may be used and that the positions of the target electrode switches may be changed between succeeding message trains. It will be further apparent that it is not necessary to operate the commutator positions in pairs but each individual position may be utilized to represent a coded message.

Thus, there has been set forth a relatively simple yet reliable generator which can produce a coded pulse output capable of carrying any desired message and which is useful not only in simulator applications but in any situation where frequency and/or amplitude modulated pulses might be useful. Since various modifications will be apparent to those skilled in the art, it is desired that the foregoing description be taken as illustrative and limited only by the following claims.

What is claimed is:

1. A coded message generator for producing a train of message pulses for display on the track maintenance console of a guidance system simulator, said generator including beam switching electron tube commutator means having a plurality of arrays of electrodes, said commutator having means for forming an electron beam, output means, switch means connecting selected ones of said arrays to said output means, means for remotely operating said switch means, means for causing said electron beam to pass from one array to the next, and means connecting said output means to said track maintenance console, said connecting means being responsive to the electron beam for selectively producing an output pulse of either of two binary values from each selected array of electrodes.

2. A coded pulse train message generator comprising a source of two alternating out-of-phase switching signals, means for producing a beam-forming pulse, a plurality of cascaded beam switching electron tube commutator devices, each commutator device having a plurality of switch positions, means responsive to said beam forming pulse for initiating an electron beam in the first switch position of the first of said plurality of commutator devices, means responsive to said alternating out-of-phase switching signals for causing said electron beam to pass sequentially from one switch position to the next through all the positions of all of said commutator devices, and means for obtaining output pulses from selected switch positions of said commutator devices.

3. A system according to claim 2, including means responsive to the electron beam at each selected switch position for modulating the amplitude of the output pulse from each switch position to a selected value.

4. In a coded pulse train message generator, a monostable multivibrator responsive to an input pulse to provide an initiating pulse output and a gating pulse output, means responsive to said gating pulse output to provide a first alternating switching signal and a second, phase shifted, switching signal, commutator means having a plurality of switch positions, said commutator means including a plurality of beam switching electron tubes connected in series, said initiating pulse starting the operation of said commutator means at the first of said switch positions, said commutator means being responsive to said first and second switching signals for operating at each succeeding switch position in turn, a plurality of switches, output means connected by said switches to selected ones of said commutator positions, said output means comprising an amplifier, a trigger circuit and a blocking oscillator, said output means being responsive to signals from said selected commutator positions to provide a train of output pulses of standard amplitude and width, the time between succeeding pulses being determined by the selection of commutator positions.

References Cited in the file of this patent

UNITED STATES PATENTS

| | | |
|---|---|---|
| 2,401,507 | Pierce et al. | June 4, 1946 |
| 2,526,694 | Samet | Oct. 24, 1950 |
| 2,543,907 | Gloess et al. | Mar. 6, 1951 |
| 2,826,378 | Childs | Mar. 11, 1958 |
| 2,847,768 | Bridges | Aug. 19, 1958 |
| 2,871,399 | Scuitto | Jan. 21, 1959 |
| 2,950,880 | Chance et al. | Aug. 30, 1960 |
| 3,011,022 | Gaffney et al. | Nov. 28, 1961 |
| 3,013,359 | Bleam | Dec. 12, 1961 |

FOREIGN PATENTS

| | | |
|---|---|---|
| 523,750 | Great Britain | July 22, 1940 |
| 318,648 | Switzerland | Feb. 28, 1957 |